United States Patent

Wagner et al.

[11] Patent Number: 5,924,918
[45] Date of Patent: Jul. 20, 1999

[54] DEVICE FOR PROCESSING POULTRY BODIES

[75] Inventors: Wolfgang Wagner, Reinfeld; Siegbert Wruck, Stralsund, both of Germany

[73] Assignee: Nordisher Maschinenbau Rud. Baader GmbH & Co. KG, Lubeck, Germany

[21] Appl. No.: 08/855,443

[22] Filed: May 13, 1997

[30] Foreign Application Priority Data

May 14, 1996 [EP] European Pat. Off. .............. 96107645

[51] Int. Cl.⁶ ...................................................... A22C 21/00
[52] U.S. Cl. .......................... 452/167; 452/179; 452/182
[58] Field of Search .................................. 452/167, 169, 452/179, 177, 180, 182, 183

[56] References Cited

U.S. PATENT DOCUMENTS

| | | | |
|---|---|---|---|
| 4,291,434 | 9/1981 | Batts | 452/167 |
| 4,709,448 | 12/1987 | McGuire et al. | 452/182 |
| 4,896,399 | 1/1990 | Hazenbroek | 452/167 |
| 4,993,113 | 2/1991 | Hazenbroek | 452/167 |

*Primary Examiner*—Willis Little
*Attorney, Agent, or Firm*—Fay, Sharpe, Beall, Fagan, Minnich & McKee

[57] ABSTRACT

Poultry bodies are processed by cutting them up into consumable products. A conveyor (1) having an endless flat link chain (4) has shackles for receiving and advancing the poultry bodies in a suspended position along a conveying path in which are arranged processing tools. An auxiliary conveyor (17) is driven by means of a gear (20) arranged in the area of the processing tool and which meshes with the linear run portion of the main conveyor by means of a gear wheel (21). By providing entrainers at a predetermined spacing between the joints (9) of the chain links (6, 7) the effective pitch of the flat link chain (4) can be at least halved and the auxiliary conveyor (17) can be driven substantially uniformly by a gear wheel (21) of relatively small diameter.

6 Claims, 1 Drawing Sheet

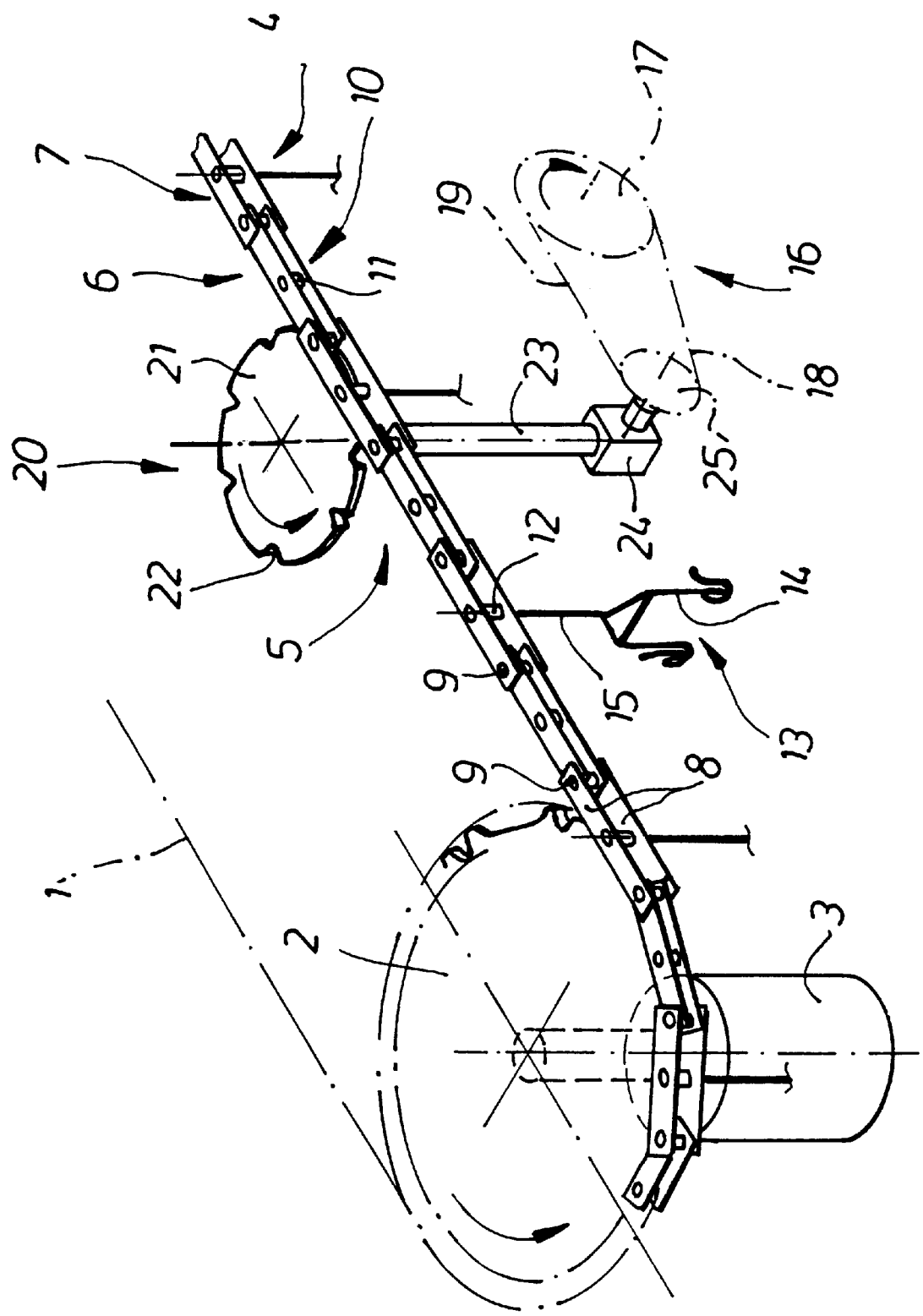

DEVICE FOR PROCESSING POULTRY BODIES

BACKGROUND OF THE INVENTION

1. Field of the Invention

The invention concerns a device for processing poultry bodies to produce consumable products, with a driven main conveyor having deflected and linear run portions and holding means for suspending the poultry bodies, the main conveyor further comprising a flat link chain with links which comprise respectively two mutually spaced plates and are connected with respective adjacent links by means of connections to form an endless conveyor, the spacing between the joints defining a chain pitch, the holding means being movable along a conveying path which traverses the operating area of at least one processing tool having auxiliary conveyors, the auxiliary conveyors being driven by means of a transmission which is operatively connected to the main conveyor.

2. Prior Art

In apparatus such as these, robust flat link chains with a relatively large pitch are favoured as conveyors due to their high transverse load carrying ability and relatively small cost. These are commonly guided as endless conveyors around deflection rollers with vertical axes and can have linear run portions of ten or more meters in length. Holding means such as shackles for receiving the poultry body to be processed are arranged on these flat link chains and moved along a conveyor path through the operating areas of a series of processing tools.

Depending on the type of processing provided it may be necessary to supplement the support to the poultry body during its movement; this is usually performed by means of an auxiliary conveyor which is driven synchronously with the main conveyor.

In this process it is important that the auxiliary conveyor is moved substantially uniformly and that the relative timing of entrainers carried by this auxiliary conveyor and the holding means stays constant after being initially set, even when the speed of the auxiliary conveyor can be adjusted.

As disclosed in U.S. Pat. No. 4,896,399, the auxiliary conveyor can be driven self-sufficiently or by means of a suitable gear connection between the auxiliary conveyor and the main conveyor with the torque generally being derived by connection with a deflection axle.

For processing tools located along the linear run of the main conveyor such an arrangement requires considerable space and expenditure due to the bridging distance to the deflection axle.

3. Objects of the Invention

It is accordingly an object of the present invention to provide a transmission arrangement which permits the driving unit of an auxiliary conveyor to link with that of a main conveyor over as short a distance as possible.

It is a further important object of the present invention to suggest a transmission arrangement which enables the transmission of a uniform and synchronous movement from a main conveyor to an auxiliary conveyor.

SUMMARY OF THE INVENTION

In an apparatus comprising main conveyor means with at least one linear portion and holding means for suspending the poultry bodies, said main conveyor means comprising an endless chain with links, each link comprising at least two plates and being connected to adjacent links by means of joints or articulations (also termed as connections in the following) which define the pitch of the chain, said chain being adapted to move said holding means along a conveying path, and processing tools being arranged in said conveying path and comprising auxiliary conveyors that are driven by said main conveyor by means of transmission means, these objects are achieved by providing that each chain link comprises at least one entrainer associated with at least one plate and arranged between the joints or connections to divide the chain pitch, and that said transmission means for driving the auxiliary conveyor comprise a gear wheel which meshes with said linear portion of said chain by engaging said connections and entrainers.

With an apparatus of this kind it is possible to reduce considerably the size of both the mechanical and electrical installations and consequently reduce the total cost of the machine. Particularly for the commonly used systems which incorporate several processing tools and auxiliary conveyors the savings can be great. Moreover, this direct transmission arrangement results in the auxiliary conveyor moving synchronously with the main conveyor while the reduced pitch of the chain ensures that the gear wheel turns substantially continuously and with a high degree of uniformity.

BRIEF DESCRIPTION OF THE DRAWING

Further objects of the present invention will be apparent from the following description and claims and are illustrated in the accompanying drawing which schematically shows a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

The sole FIGURE shows a detail of a processing arrangement for poultry bodies, a so-called "cut-up" line, in which poultry bodies are conveyed while suspended from their legs. The advancement is effected by a main conveyor 1 which is installed in a non-shown system frame. The main conveyor comprises at least two deflection wheels 2, of which only one, which is driven by a gear motor 3, is shown in the FIGURE. The deflection wheels 2 guide an endless flat link chain 4 in a horizontal plane of revolution to form linear run portions 5. Each chain link 6, 7 of the flat link chain 4 comprises two mutually spaced, horizontally extending tongues or plates 8 and is connected to adjacent links by means of vertically extending joints 9 which may consist of bolts with rotary sleeves. The bolts may pass through only one plate end of each link, but a more stable arrangement is achieved when the bolt anchors two plate ends in each link. Each alternate chain link 6 is provided with an entrainer 10 located essentially centrally between the joints 9. The entrainers 10, respectively, comprise a round bolt 11 attached to each of the opposing plates and possibly surrounded by a rotary sleeve in the same way as the joints 9. In each of the remaining links 7 an entrainer 12, which is a spacer or distance bush is located substantially halfway between the two joints 9. Each entrainer or distance bush 12 is adapted to receive holding means 13 in the form of a shackle 14 for engaging the legs of the poultry bodies, the shackle preferably being mounted for controlled rotation in 90° steps.

A processing tool 16, which may be provided and designed for severing the legs of the poultry bodies, is arranged in the conveying path of the main conveyor 1 and comprises an auxiliary conveyor 17. The drawing shows only a simplified representation of this auxiliary conveyor 17. As indicated, the auxiliary conveyor 17 may comprise a driven endless chain 18 that may be provided with entrainers for engaging the poultry bodies. To this end, the working run of the endless chain 18 is arranged to run parallel with, and at the same speed as, the main conveyor. The auxiliary conveyor 17 is driven by means of a gear 20 which comprises at its input a gear wheel 21 which is suitably mounted on the frame to rotate in an essentially horizontal plane and which extends between the plates of the flat link chain 4 of the main conveyor 1. The edge of the gear wheel 21 is provided with recesses or notches 22 at a pitch corresponding essentially to half the distance between joints 9. These notches mesh with the vertical entrainers 10, 12 and the joints 9 which accordingly impart a rotational and synchronous movement to the gear wheel 21. The gear wheel 21 is connected to the driving shaft of an angular gear 24 by means of a transmission rod 23. The driving shaft is in turn provided with a further gear wheel 25 which drives the endless chain 18.

Due to the reduced effective pitch of the flat link chain 4 of the main conveyor 1, processing tools with auxiliary conveyors can be driven by the engagement of a gear wheel with a relatively small diameter. As a result, the gear unit can have an exceptionally compact structure and be usefully employed in a diverse range of applications, while the main conveyor 1 may comprise links of a dimension which renders the chain relatively inexpensive to manufacture with a high transverse load carrying ability. Moreover, in this arrangement the relative speeds of the main and auxiliary conveyors 1, 17 can be adjusted in a predetermined manner merely by varying the transmission ratio of the angular gear 24.

It will be appreciated that two or more entrainers 10 can be provided between the connections 9 to reduce the effective pitch of the chain still further or to allow the use of larger, more robust chain structures while retaining the compact overall structure of the system. In such an arrangement it is preferred that the spacing between adjacent entrainers and joints is equidistant for ease of fabrication of the gear wheel 21.

We claim:

1. An apparatus for processing poultry bodies comprising main conveyor means with at least one linear portion and holding means for suspending the poultry bodies, said main conveyor means comprising an endless chain with a plurality of links each including at least two plates and being connected to adjacent links by means of joints which define the pitch of the chain, said chain being adapted to move said holding means along a conveying path, and processing tools being arranged along said conveying path and comprising auxiliary conveyor means and transmission means, said auxiliary conveyor means being driven by said main conveyor means through said transmission means, wherein each said chain link comprises at least one entrainer associated with at least one plate and arranged between said joints to divide said pitch of the chain, and said transmission means comprises a gear wheel which meshes with said linear portion of said chain by engaging said joints and said entrainers.

2. An apparatus as claimed in claim 1, wherein said joints and said entrainers are arranged equidistantly spaced along said chain.

3. An apparatus as claimed in claim 1, wherein said entrainers respectively comprise a round bolt connecting the plates of each chain link.

4. An apparatus as claimed in claim 3, wherein said round bolt is provided with a rotary sleeve.

5. An apparatus as claimed in claim 1, wherein at least some of said entrainers comprise said holding means.

6. An apparatus as claimed in claim 1, wherein said entrainers are disposed centrally between the joints of a respective chain link.

\* \* \* \* \*

UNITED STATES PATENT AND TRADEMARK OFFICE
CERTIFICATE OF CORRECTION

PATENT NO. : 5,924,918
DATED : July 20,1999
INVENTOR(S) : Wagner et al.

It is certified that error appears in the above-identified patent and that said Letters Patent is hereby corrected as shown below:

On the title page, item [73],

Change the spelling of the Assignee from "Nordisher" to --Nordischer--.

Signed and Sealed this

Sixteenth Day of May, 2000

Attest:

Q. TODD DICKINSON

Attesting Officer     Director of Patents and Trademarks